US012744460B2

(12) United States Patent
Oner et al.

(10) Patent No.: US 12,744,460 B2
(45) Date of Patent: Sep. 22, 2026

(54) VALLEY CURRENT MODE CONTROL FOR A VOLTAGE CONVERTER

(71) Applicant: Texas Instruments Incorporated, Dallas, TX (US)

(72) Inventors: Hakan Oner, San Jose, CA (US); Tawen Mei, Sunnyvale, CA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 269 days.

(21) Appl. No.: 18/342,070

(22) Filed: Jun. 27, 2023

(65) Prior Publication Data

US 2023/0344345 A1 Oct. 26, 2023

Related U.S. Application Data

(62) Division of application No. 17/314,710, filed on May 7, 2021, now Pat. No. 11,722,061.

(51) Int. Cl.
*H02M 3/158* (2006.01)
*H02M 1/00* (2006.01)

(52) U.S. Cl.
CPC ......... *H02M 3/158* (2013.01); *H02M 1/0003* (2021.05)

(58) Field of Classification Search
CPC ... H02M 3/158; H02M 1/0003; H02M 1/0025
See application file for complete search history.

(56) References Cited

U.S. PATENT DOCUMENTS 8,773,099 B2 * 7/2014 Granger .............. H02M 3/1588 323/284
8,922,186 B2 12/2014 Chen
9,467,051 B2 10/2016 Stoichita
2011/0018516 A1 * 1/2011 Notman .............. H02M 3/1588 323/284
2014/0239925 A1 * 8/2014 Tanabe .................. H02M 3/158 323/271
2017/0047843 A1 2/2017 Bawa
2017/0187284 A1 * 6/2017 Vaidya .................... H02M 1/38
2019/0081546 A1 3/2019 Hsu
2020/0389090 A1 12/2020 Ruan
2021/0152088 A1 5/2021 Volk
2022/0239223 A1 * 7/2022 Liao ........................ H02M 1/08
2022/0416646 A1 12/2022 Ruan

FOREIGN PATENT DOCUMENTS

CN 102237791 B 9/2013

* cited by examiner

*Primary Examiner* — Alex Torres-Rivera
(74) *Attorney, Agent, or Firm* — Zhenhai Fu; Frank D. Cimino

(57) ABSTRACT

A switching regulator includes a first transistor having a control input and the first transistor is coupled to an input voltage terminal. The regulator includes a second transistor having a control input. The second transistor is coupled to the first transistor at a switch terminal and to a ground terminal. The regulator also includes a controller coupled to the control inputs of the first and second transistor. The controller configured is configured to cause both the first and second transistors to be off concurrently during each of multiple switching cycles for an adaptive high impedance state. The length of time of the adaptive high impedance state is inversely related to current output by the switching regulator.

15 Claims, 11 Drawing Sheets

VALLEY CURRENT MODE CONTROL FOR A VOLTAGE CONVERTER

CROSS-REFERENCE TO RELATED APPLICATIONS

This application is a division of U.S. patent application Ser. No. 17/314,710 filed May 7, 2021, which is hereby incorporated herein by reference in its entirety.

BACKGROUND

A voltage converter converts an input direct current (DC) voltage to an output DC voltage. The input voltage is specified to be within a given range (e.g., 5V to 15V) while the output voltage is regulated to a specific level (e.g., 3.3V). One type of a voltage converter is a switching converter which includes one or more power transistors operated as switches to switch the input voltage and/or ground to a switching node, which may then be connected through other analog components to the output terminal of the converter. One type of switching converter is a buck converter in which the output voltage is regulated to be a value that is smaller than the input voltage.

A buck converter includes a high side (HS) transistor coupled between the switching node and the input voltage (VIN) and a low side (LS) transistor coupled between the switching node and ground. An inductor is coupled between the switching node and the converter's output and to an output capacitor. A controller controls the state (on or off) of the HS and LS transistors. The transistors should not be on at the same time, otherwise a short-circuit current path will be present between the input voltage and ground. When the HS transistor is on, current through the inductor increases, and when the LS transistor is on, current through the inductor decreases. The controller controls the on and off states of the HS and LS transistors so as to maintain a regulated output voltage (VOUT) level.

One type of control technique implemented by a buck converter's controller is valley current mode control. In this mode, a clock pulse within the converter's controller causes the HS transistor to be turned off and causes the LS transistor to be turned on. With the LS transistor being on, the inductor current decreases. For valley current mode control, the controller detects when the inductor current reaches a "valley command" current (a current threshold). When the inductor current reaches the valley command, the controller reverses the on/off state of the LS and HS transistors. With the HS transistor now being on, the inductor current increases and continues to increase until the next clock pulse occur at which time the next switching cycle begins, and the on/off states the transistors are again reversed.

SUMMARY

A switching regulator includes a first transistor having a control input and the first transistor is coupled to an input voltage terminal. The regulator includes a second transistor having a control input. The second transistor is coupled to the first transistor at a switch terminal and to a ground terminal. The regulator also includes a controller coupled to the control inputs of the first and second transistor. The controller configured is configured to cause both the first and second transistors to be off concurrently during each of multiple switching cycles for an adaptive high impedance state. The length of time of the adaptive high impedance state is inversely related to current output by the switching regulator.

BRIEF DESCRIPTION OF THE DRAWINGS

For a detailed description of various examples, reference will now be made to the accompanying drawings in which:

FIGS. 8A-1, 8A-2, 8B-1, 8B-2, and 8C provide an example implementation of the converter of FIG. 1.

DETAILED DESCRIPTION

Figure 1:
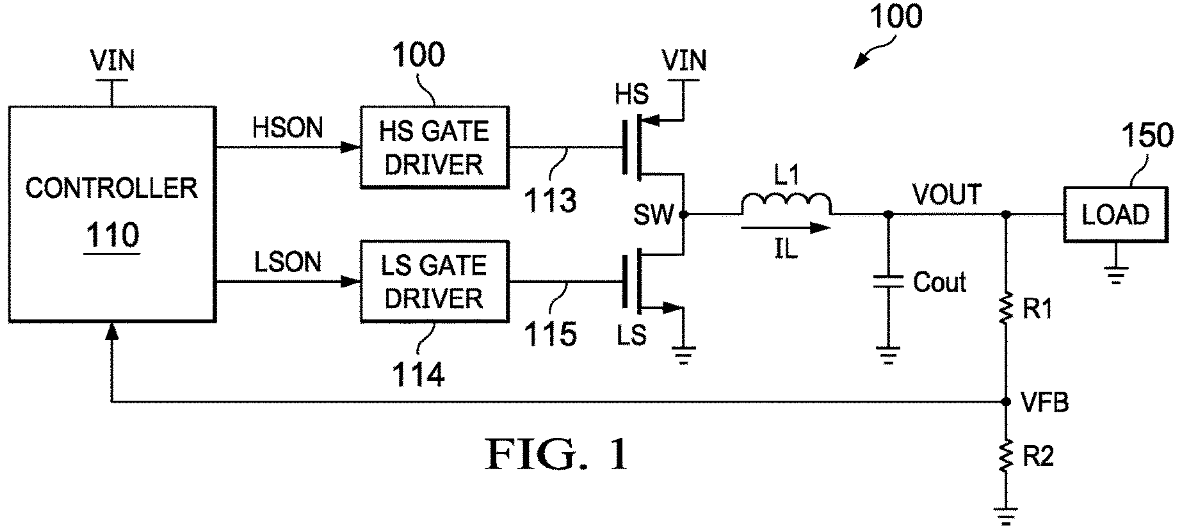
FIG. 1 illustrates a voltage converter in accordance with an example implementation.

FIG. 1 shows a buck converter 100 in accordance with an example implementation. Buck converter 100 includes a high side (HS) transistor and a low side (LS) transistor. In this example, the HS transistor is a P-type metal oxide semiconductor field effect transistor (PMOS transistor) and the LS transistor is an N-type metal oxide semiconductor field effect transistor (NMOS transistor), although other types of transistors can be used. The source of the HS transistor receives the input voltage, VIN. The drains of the HS and LS transistors are coupled together at the switching node (SW). The source of the LS transistor is coupled to ground. An inductor L1 is coupled between the SW node and the output (VOUT) of the converter 100. The current through the inductor L1 is shown as current IL. The current through the inductor L1 also is the load current to the load 150. An output capacitor, Cout, is coupled between VOUT and ground. A load 150 is shown receiving a supply voltage (VOUT) from the converter 100.

A voltage divider including resistors R1 and R2, coupled in series between VOUT and ground, generates a feedback voltage (VFB), which is coupled to a controller 110. The controller 110 generates control signals HSON and LSON. The HSON control signal is provided to a high side gate driver 112, which generates a gate voltage 113 to the gate of the HS transistor to turn on that transistor. Similarly, the LSON control signal is provided to a low side gate driver 114, which generates a gate voltage 115 to the gate of the LS transistor to turn on that transistor. In one embodiment, the controller 110 is implemented on an integrated circuit (IC). The HS and LS transistors, capacitor Cout, and the inductor L1 may be implemented on the same IC as the controller 110 or one or more of the HS and LS transistors, capacitor Cout, and the inductor L1 may be implemented separate from the controller's IC (e.g., on a separate IC).

The controller 110 is configured to operate in any of several different modes of operation including, for example, a continuous conduction mode (CCM), a discontinuous conduction mode (DCM), and a pulse frequency mode (PFM). Controller 110 also implements valley current mode control (VCMC) in which the controller detects when the inductor current falls to a minimum target level.

Figure 2:
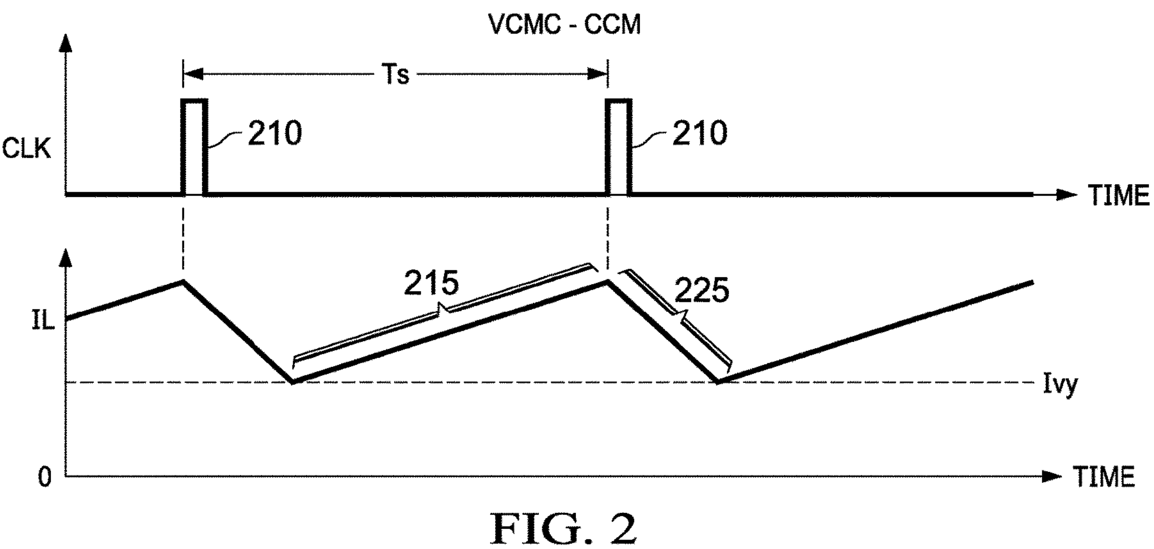
FIG. 2 illustrates the behavior of a converter, which implements valley current mode control, during continuous conduction mode (CCM).

FIG. 2 illustrates the CCM in which the inductor current IL increases when the HS transistor is on (and the LS transistor is off) and decreases when the LS transistor is on (and the HS transistor is off). A fixed frequency clock signal (CLK) is generated internal to controller 110. Consequently, the switching period, also is fixed during CCM (referred to a Ts). Just before a clock pulse 210 occurs, the HS transistor is on (and LS transistor is off). With the HS transistor on, the inductor current IL increases linearly as shown at 215. Upon occurrence of the clock pulse 210 (e.g., its rising edge), the controller 110 causes the HS transistor to be turned off and the LS transistor to be turned on. With the LS transistor on, the inductor current IL decreases linearly as shown at 225. The valley command current (Ivy) is the minimum level that the inductor current IL should reach. When the current IL falls to the valley command current, Ivy, the controller 110 responds by reversing the on/off state of the transistors—the HS transistor is turned on and the LS transistor is turned off. The switching cycle repeats at a fixed frequency in this way. Accordingly, in CCM, the clock is used to turn on the LS transistor and the inductor current falling to the valley command current causes the LS transistor to be turned off and the HS transistor to be turned on.

In some situations, the current draw of load 150 may decrease (e.g., the load 150 may transition to a low power state). The converter 100 continues to operate in CCM (and thus fixed switching period) as load current decreases. The converter 100 may transition to DCM operation in which inductor current falls to 0 A during each switching cycle (at which point both the HS and the LS transistors are off), but the switching frequency (and thus switching period) remains unchanged.

Figure 3:
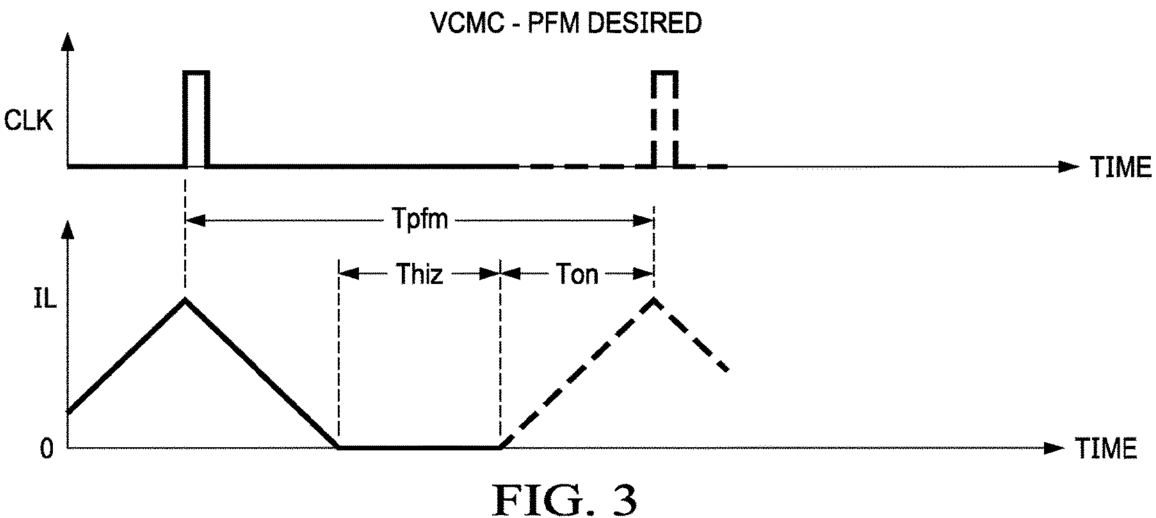
FIG. 3 illustrates the behavior of a converter during pulse frequency mode (PFM).

At even lower levels of load current, the converter 100 may be forced to operate in PFM, which is illustrated in FIG. 3. As with DCM, in PFM the controller 110 causes both transistors to be off for a period of time during each switching cycle. The time period in which both transistors are off is referred to herein as a high impedance period and is shown in FIG. 3 as Thiz. In PFM, the controller 110 also increases the length of time of each switching cycle (Tpfm) to be greater than Ts (the switching period during CCM). In PFM operation, the controller 110 determines the length of Thiz and thus when to turn on the HS transistor, and also determines the on-time (Ton) of the HS transistor.

Figure 4:
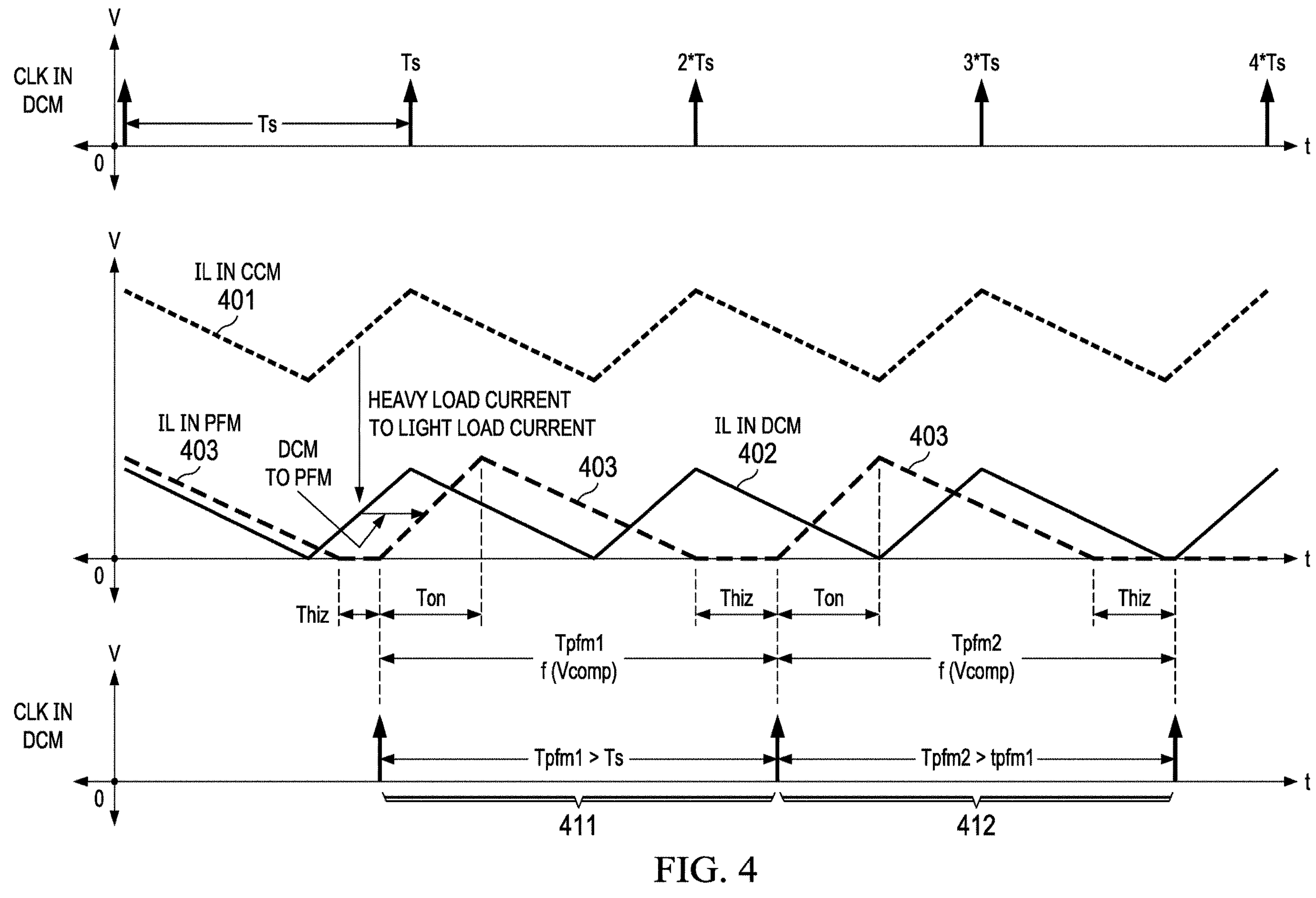
FIG. 4 illustrates that the converter of FIG. 1 implements an adaptive high side (HS) transistor on-time based on duty cycle and a high impedance state during each switching cycle during PFM.

FIG. 4 illustrates conceptually how the controller 110 determines the values for Toff and Ton. FIG. 4 shows three waveforms for the inductor current IL. Waveform 401 illustrates IL during CCM. Waveform 402 illustrates IL during DCM in which the HS transistor is turned on as soon as the inductor current reaches 0 A. Waveform 403 illustrates IL during PFM. The magnitude of waveforms 402 and 403 (DCM and PFM) is smaller than waveform 401 (CCM).

Figure 8C:
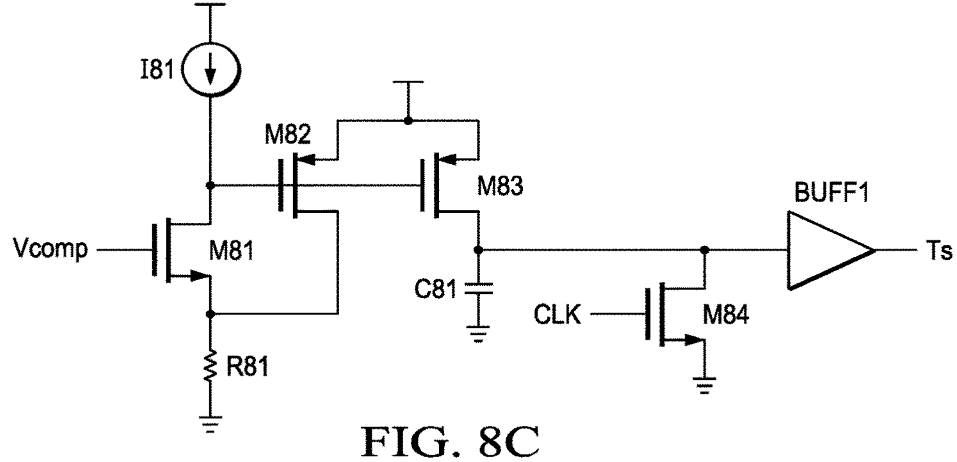

In accordance with an illustrative embodiment, for the PFM inductor current waveform 403, Thiz is determined to be inversely related to a signal called Vcomp. Vcomp is a signal that indicates the magnitude of load current—higher load current results in Vcomp being higher and lower load current results in Vcomp being lower. The generation of Vcomp is shown in FIG. 8B and described below. Vcomp is used in PFM to determine the length of the Thiz period—lower levels of Vcomp causes larger Thiz periods to be implemented by the controller 110 and higher levels of Vcomp causes smaller Thiz periods to be implemented. The controller 110 also dynamically adapts Ton to be based on the duty cycle of the converter 100. The duty cycle (D) of the converter 100 is the ratio of Vout to Vin (D=Vout/Vin). The controller 110 determines Ton to be D*Ts. FIG. 4 illustrates several switching cycles for PFM operation. In switching cycle 411, the period of the cycle 411 is Tpfm1. Tpfm1 is larger than the switching period, Ts, of CCM operation. In switching cycle 412, the load current has become even smaller and the switching period of cycle 412, and consequently Tpfm2 is even longer than the switching period Tpfm1 of the preceding cycle 411. The high impedance period, Thiz, is longer in switching cycle 412 than in switching cycle 411.

Figure 5:
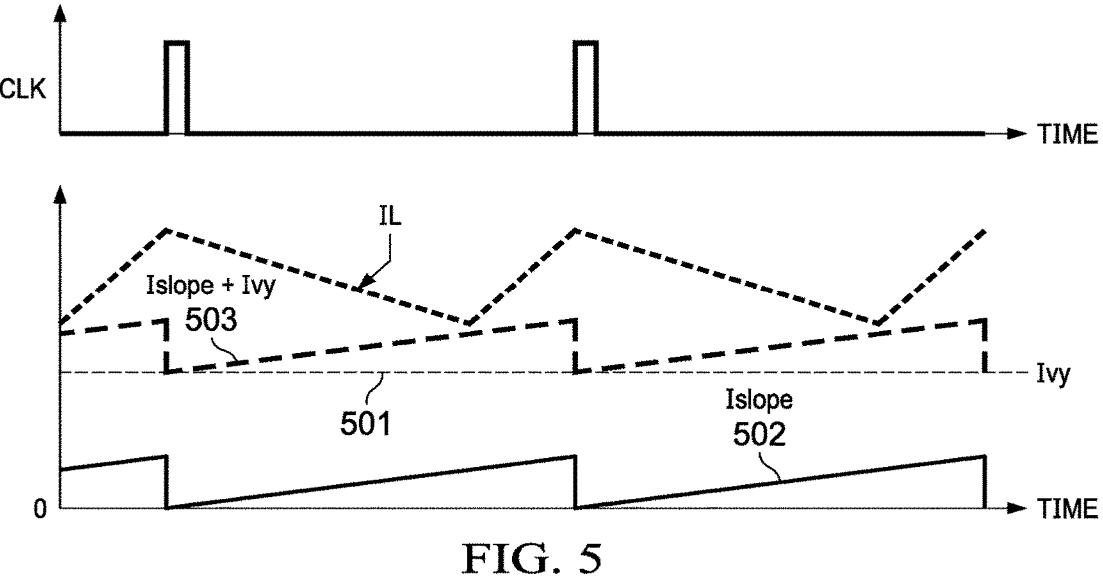
FIG. 5 illustrates a slope-compensated valley command current.

Referring again to FIG. 2 CCM mode of operation is illustrated for valley mode current control in which the inductor current, IL, is compared to the valley current command, Ivy. In this example, the valley current command Ivy is a fixed current. In many implementations, however, a slope compensation current is added to the valley current command resulting in a slope-compensated valley current command to ensure stability of the system. FIG. 5 illustrates waveforms 501-503. Waveform 501 is the fixed level, valley current command, Ivy. Waveform 502 is a slope current, Islope, that includes a linear ramp for each switching cycle. The linear ramp increases linearly in this example, drops back to 0 A, and then repeats. Waveform 503 represents a current that is the sum of Islope and Ivy. Rather than comparing the inductor current IL to Ivy, the controller 10 compares the inductor current to the slope-compensated valley current command, Islope+Ivy. For a buck converter controlled with valley current mode control, slope compensation of the valley command is beneficial for stability purposes for duty cycles (D) between 0 and 0.5 to prevent sub-harmonic oscillations.

Figure 6:
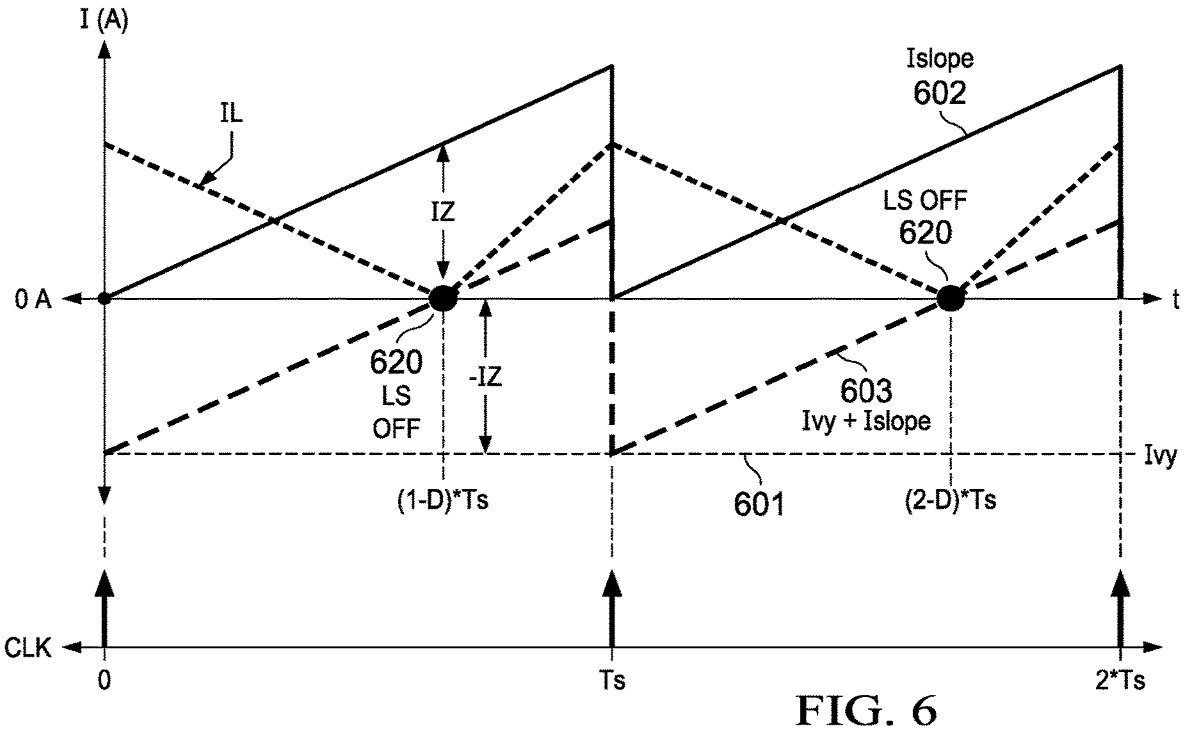
FIG. 6 illustrates slope-compensation for a valley command current in which the valley command current may be a negative current.

At lower levels of inductor current, the slope-compensated valley command also decreases. FIG. 6 illustrates the converter 110 operating in the boundary condition between CCM and DCM. In this situation, the inductor current IL drops to 0 A at which time the LS transistor is turned off. Waveform 601 is the fixed level, valley current command Ivy. Waveform 602 is the slope current, Islope. Waveform 603 is the sum of Ivy and Islope. In order for Ivy+Islope to be 0 A during the switching cycle and because the Islope increases linearly starting at 0 A, the valley current command Ivy must be capable of being a negative current value. Implementing a negative value for Ivy would require the controller 110 to have a negative power supply voltage in addition to a positive power supply voltage. However, as conceptually illustrated in FIG. 7 and described below, the implementation of the controller 110 is such that a negative power supply voltage is not required.

Figure 7:
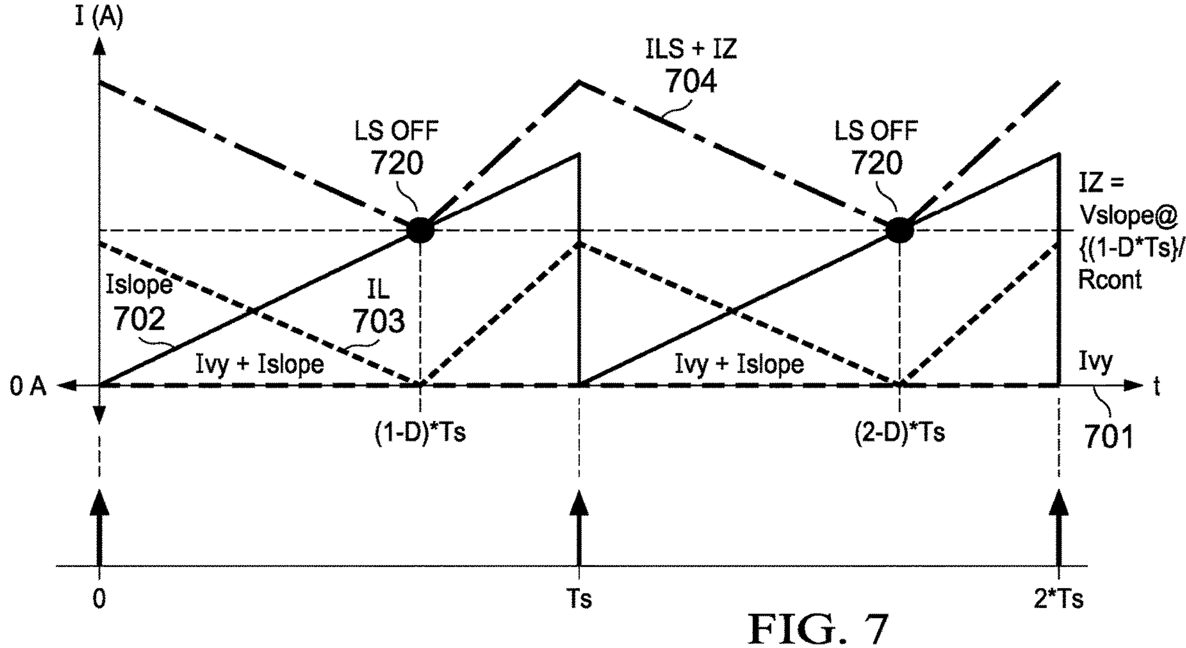
FIG. 7 illustrates slope-compensation which includes use of an offset current to avoid the use of a negative valley command current in accordance with an example implementation of the converter of FIG. 1.

FIG. 7 conceptually illustrates the solution implemented by the controller 110 to avoid a negative valley current command, Ivy. Referring briefly again to FIG. 6, at point 620 on the time axis, the inductor current IL has reached 0 A and the LS transistor is turned off. Point 620 also occurs at (1−D)*Ts from the beginning of the increasing ramp of Islope (when the HS transistor is turned on). At that point, the positive amplitude of Islope is equal to the absolute value of Ivy. That is, at 620, Islope is as much a positive current (IZ) as Ivy is a negative current (−IZ). Current IZ is referred to herein as an offset current. Thus, rather than comparing the inductor current IL to the compensated valley current command, in DCM and PFM, the offset current IZ is added to the inductor current IL, and the sum of the currents (IL+IZ) is compared to the slope current Ivy+Islope.

FIG. 7 illustrates this solution. Waveform 701 is the valley current command Ivy, which is at 0 A for DCM and PFM. Waveform 702 is the slope current Islope. Waveform 704 is a current that is the sum of the inductor current IL and the offset current IZ. FIG. 7 denotes the sum as ILS+IZ. The current ILS is a current that is sensed based on the inductor current IL. The inductor current IL can be quite large (several amperes to more than 10 amperes) and it can be impractical for the controller 110 to use the inductor current itself in its control scheme. Instead, a current sense network (described below) coupled to the LS transistor provides a current ILS that is proportional to, but a fraction of, the magnitude of the inductor current IL. The current (ILS+IZ) is compared to Ivy+Islope. When the sum of ILS and IZ falls to the level of Ivy+Islope, at a time point designated 720, the controller 110 turns off the LS transistor. In the example of FIG. 7, the controller 110 also turns on the HS transistor at point 720 and thus ILS+IZ increases as shown. At lower load current levels, the controller may implement a high impedance period (Thiz) after turning off the LS transistor and before turning on the HS transistor.

Figures 1, 8A:
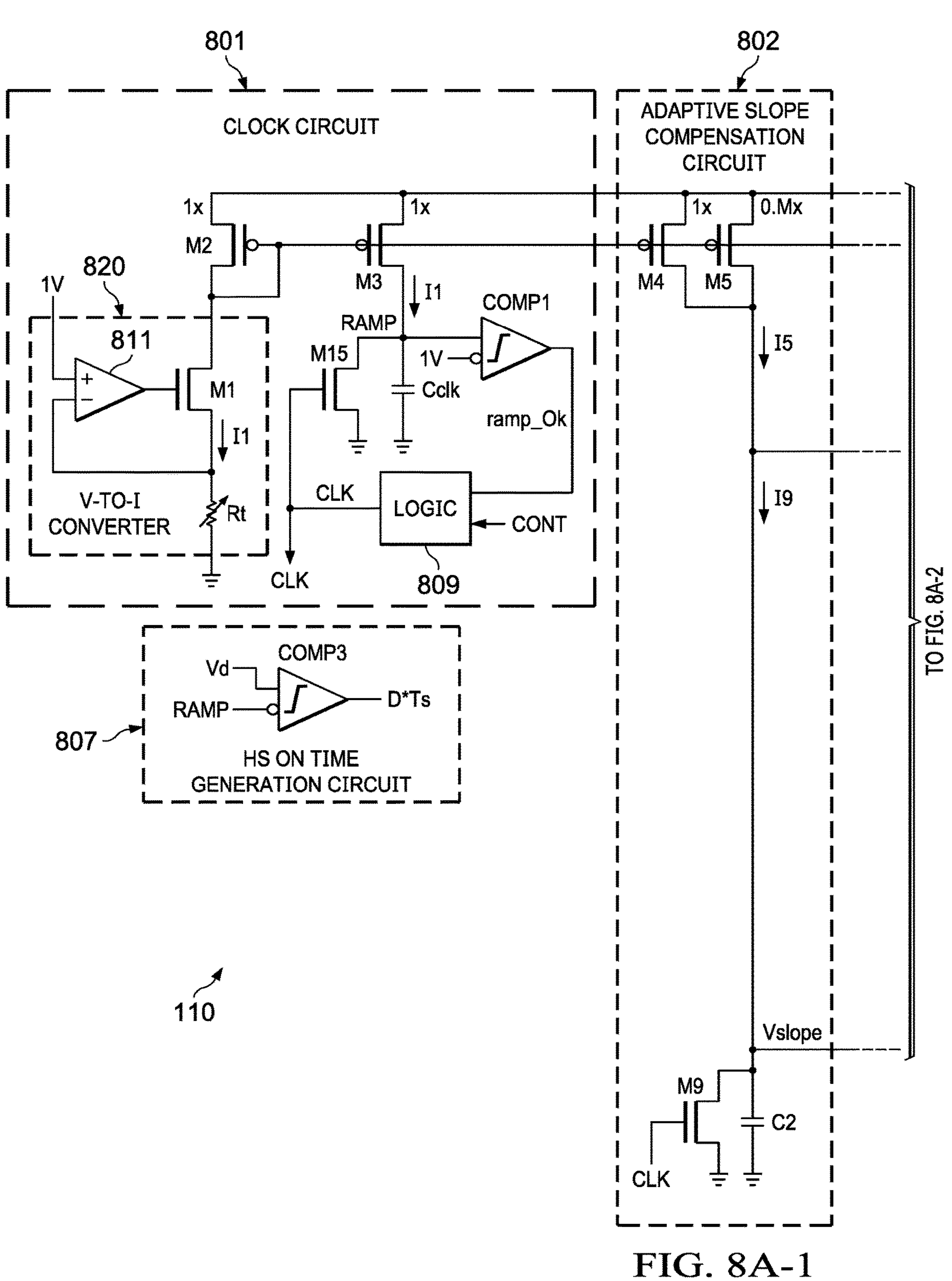
Figures 2, 8A:
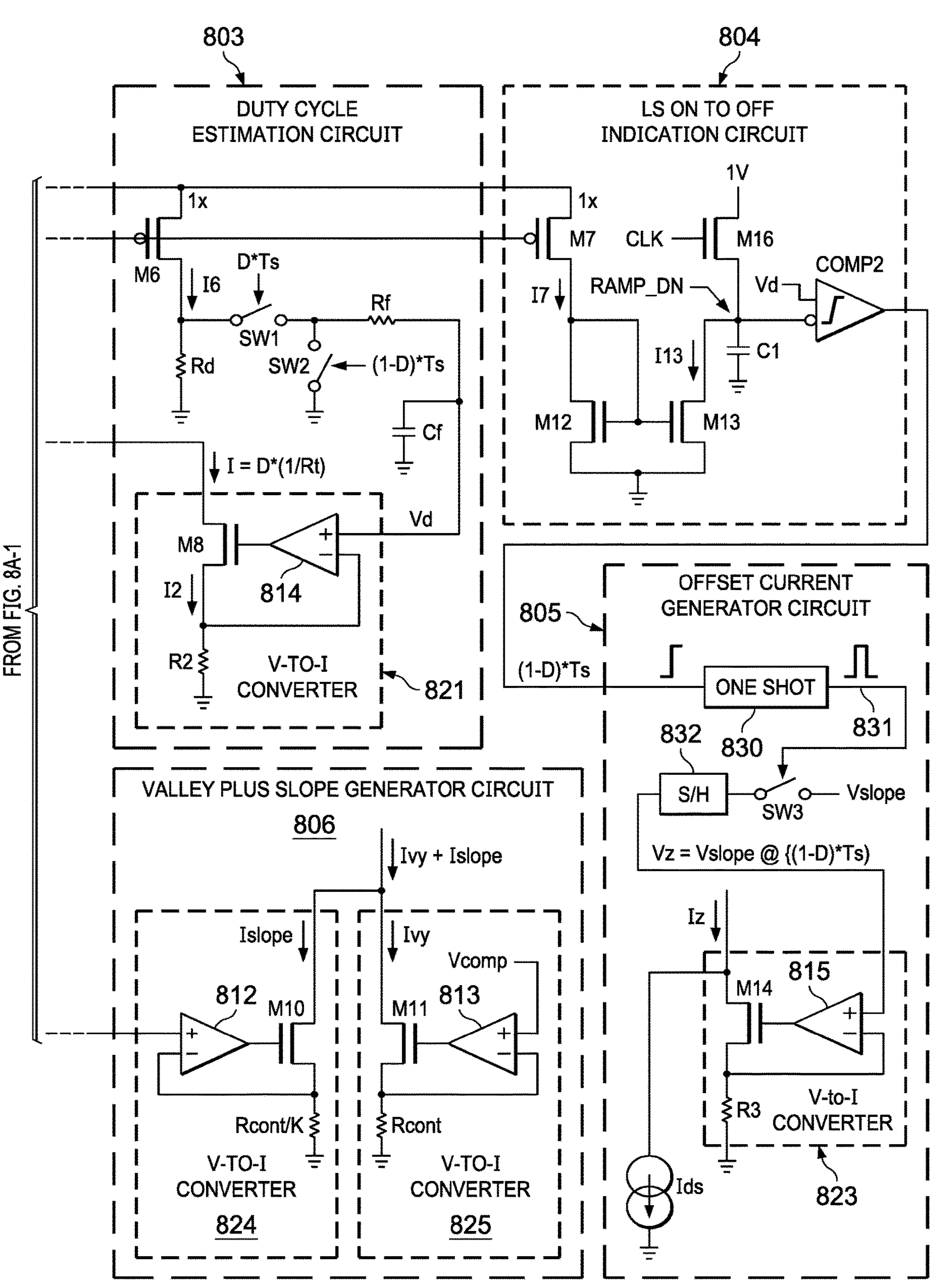
Figures 1, 8B:
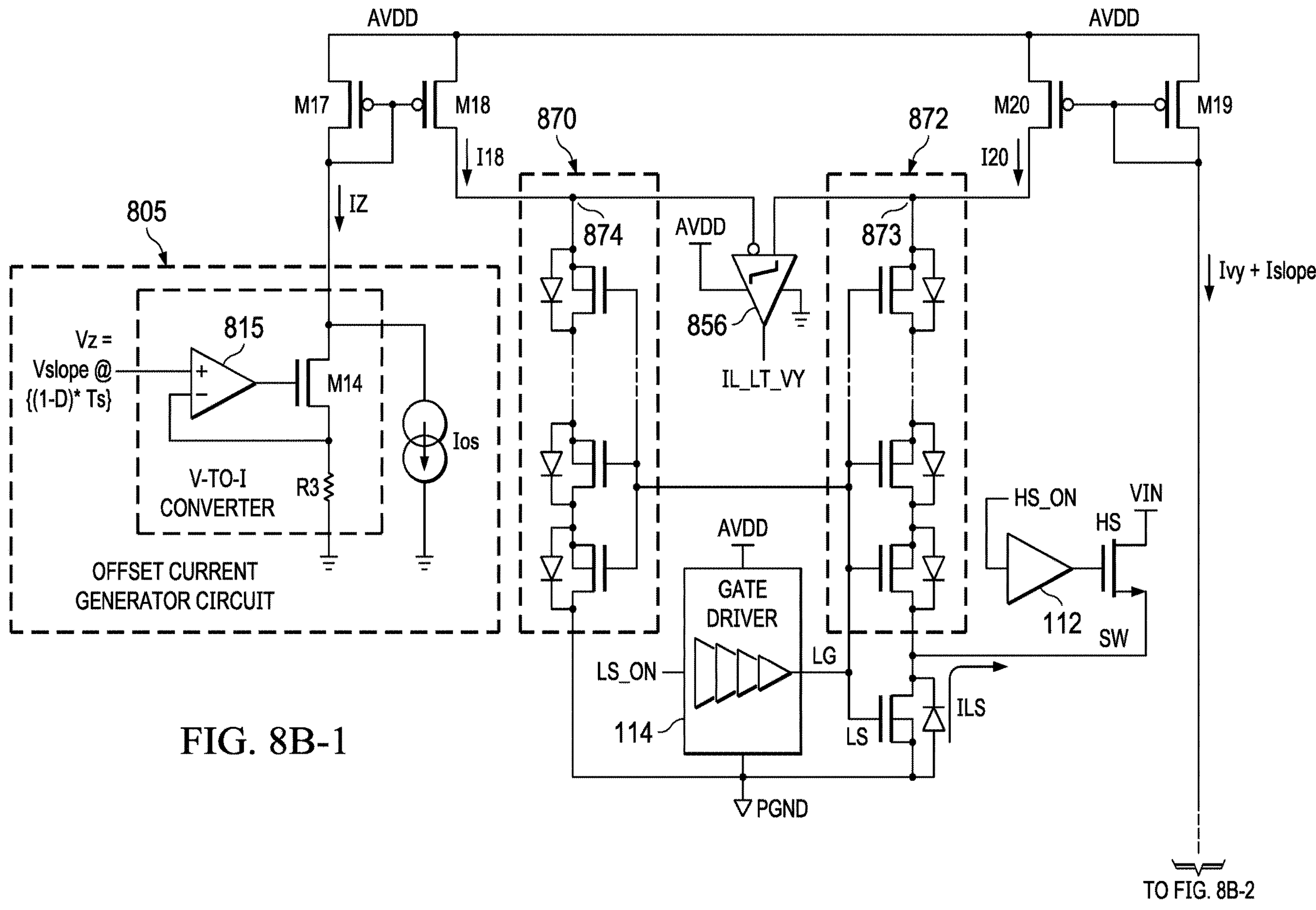
Figures 2, 8B:
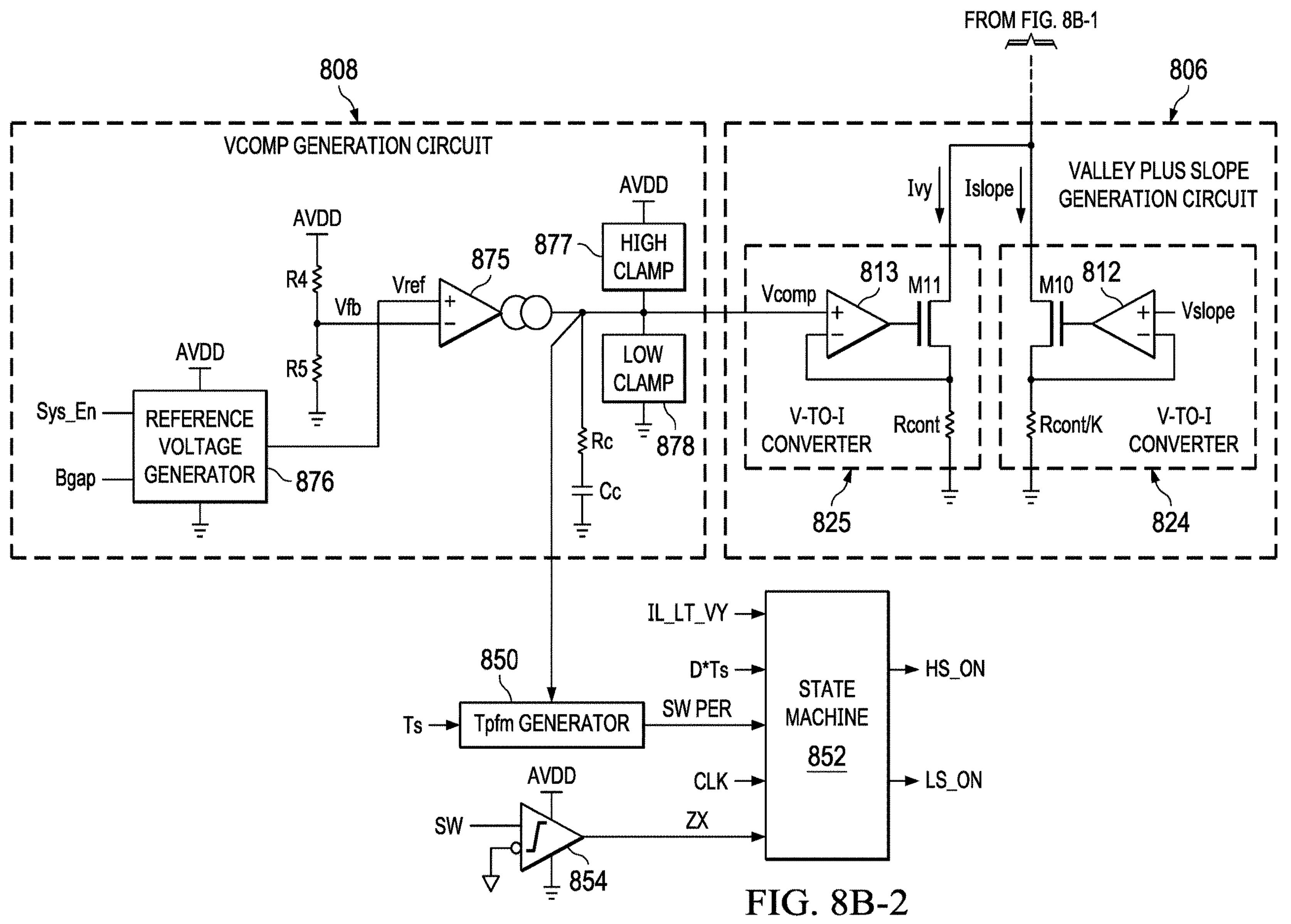

FIGS. 8A-1 and 8A-2 (collectively "8A") and 8B-1 and 8B-2 (collectively "8B") collectively show an embodiment of at least a portion of the controller 110. As shown, controller 110 includes a clock circuit 801, an adaptive slope compensation circuit 802, a duty cycle estimation circuit 803, an LS on to off indication circuit 804, an offset current generator circuit 805, a valley plus slope generation circuit 806, an HS on-time generation circuit 807, and a VCOMP generation circuit 808. Additional components are shown as well and will be described herein.

The controller 110 illustrated in the example of FIGS. 8A and 8B includes multiple transistors. The transistors are shown as metal oxide semiconductor field effect transistors (MOSFETs) with some of the MOSFETs being N-type MOSFETs and other MOSFETS being P-type MOSFETs. Alternative embodiments of controller 110 include at least some of the transistors being implemented as other types from those shown in FIGS. 8A and 8B (e.g., P-type MOSFETs in place of N-type MOSFETs, bipolar junction transistors in place of MOSFETs, etc.).

The clock circuit 801 generates the fixed frequency clock (CLK) described above that is used during CCM to cause the LS transistor to be turned on. The clock circuit 801 includes transistors M2, M3, and M15, a voltage-to-current (V-to-I) converter 820, and a capacitor Cclk, comparator COMP1. The V-to-I converter 820 includes an operational amplifier (op-amp) 811, a transistor M1, and a resistor Rt. The positive (+) input of the op-amp 811 is coupled to a fixed voltage, which in this example is 1V. The output of the op-amp 811 is coupled to the gate of transistor M1, and resistor Rt is coupled between the source of transistor M1 and ground. The resistor Rt is also coupled to the negative (−) input of op-amp 811. Because the voltage on both inputs of an op-amp are approximately equal at steady state, the voltage on the negative (−) input of op-amp 811 also is 1V. Accordingly, the voltage across resistor Rt is 1V, the same voltage as on the positive input of op-amp 811. The current through resistor Rt is labeled I1. The magnitude of current I1 is 1V/Rt.

Transistors M2 and M3 are coupled together to form a current mirror with a 1:1 current mirror ratio (the size (ratio of channel width to channel length) of transistors M2 and M3 are equal). Accordingly, current I1 also flows through transistor M3. When CLK is low, transistor M15 is off and current I1 charges capacitor Cclk thereby creating a linearly increasing ramp voltage (RAMP) across capacitor Cclk. When CLK is high, transistor M15 is on and the charge on capacitor Cclk discharges through transistor M15 to ground. Accordingly, the RAMP voltage is a saw-tooth signal. RAMP is provided the positive input of comparator COMP1, and the negative input of comparator COMP1 is coupled to the fixed voltage of 1V. The output signal from comparator COMP1 (RAMP_OK) is high when RAMP is greater than 1 V and low when RAMP is smaller than 1V. As RAMP linearly increases, the output of comparator COMP1 (RAMP_OK) is low. When RAMP eventually reaches 1V, RAMP_OK becomes logic high. RAMP_OK is provided to an input of logic 809. Logic 809 responds to the rising edge of RAMP_OK by generating a pulse on CLK. The clock pulse is used during CCM by the controller 110 to turn off the LS transistor as noted above. The clock pulse is also used to turn on transistor M15 and reset RAMP back to 0V to start the next cycle of the saw tooth waveform for RAMP. As will be explained below, RAMP is provided to the HS on-time generation circuit 807.

The duty cycle estimation circuit 803 a V-to-I converter 821, transistor M6, resistors Rd and Rf, a capacitor Cf, and switches SW1 and SW2. Transistors M2 and M6 are coupled together to form a current mirror with a 1:1 current mirror ratio. Accordingly, the magnitude of current I6 through transistor M6 is equal to the magnitude of the current I1 (I6=1/Rt). Transistor M6 is coupled to resistor Rd and thus the current I6 flows to resistor Rd resulting in a voltage across resistor Rd equal to Rd/Rt. The signal "D*Ts" opens and closes switch SW1. In this example, when D*Ts is low, switch SW1 is closed and when D*Ts is high, switch SW1 is open. Signal D*Ts is high for a portion of each switching cycle corresponding to the HS transistor being on. Signal D*Ts is the output of the HS on-time generation circuit 807, described below, and during CCM is a logic low signal during each switching cycle when the HS transistor is on. Switch SW2 is controlled by a signal labeled (1−D)*Ts, which is the output signal from the LS on off indication circuit 804, also described below. During CCM, signal (1−D)*Ts is a logic low signal during each switching cycle when the LS transistor is on. When D*Ts is low, switch SW1 is closed and when (1−D)*Ts is slow, switch SW2 is closed. When switch SW1 is closed, the voltage Rd/Rt across resistor Rd is applied to resistor Rf and capacitor Cf. Capacitor Cf is charged accordingly. When switch SW2 is closed, capacitor Cf discharges.

The V-to-I converter 821 includes an op-amp 814, a transistor M8, and a resistor Rd. The V-to-I converter 821 is configured similarly to V-to-I converter 820 and replicates the voltage Vd on its positive input on its negative input and thus across resistor R2. Resistor R2 in this example has a resistance equal to resistor Rd. Using D*Ts and (1−D)*Ts signals to reciprocally turn on and off the respective switches SW1 and SW2, the voltage Vd is equal to D*(Rd/Rt) and thus is a function of the duty cycle D of the converter. The current through resistor R2 is labeled I2 and is equal to Vd/R2 which equals D/Rt.

The HS on-time generation circuit 807 includes a comparator COMP3. The positive input of op amp 814 (which carries duty cycle estimation voltage Vd) is coupled to the positive input of comparator COMP3. The negative input of comparator COMP3 is coupled to capacitor Cclk and the positive input of comparator COMP1 and thus receives the RAMP signal. Comparator COMP3 compares Vd to the RAMP signal and outputs signal D*Ts.

Figure 9:
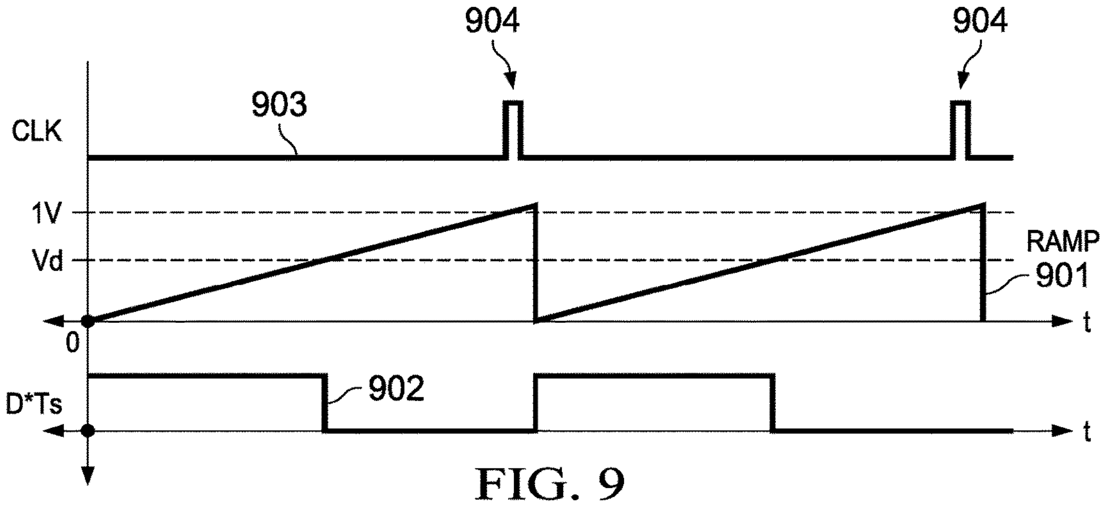
FIGS. 9-11 illustrate waveforms of signals within the converter of FIG. 1.

FIG. 9 illustrates the operation of comparator COMP3. In FIG. 9, waveform 901 is the RAMP signal and waveform 902 is the D*Ts signal. While RAMP is smaller than Vd, the D*Ts signal is logic high. D*Ts becomes logic low once RAMP exceeds Vd. FIG. 9 also shows a waveform 903 which is the clock signal CLK. A pulse 904 is generated by logic 809 each time RAMP exceeds the voltage on the positive input of comparator COMP1 (1V in the example of FIG. 8A).

Referring again to FIG. 8A, the LS on to off indication circuit 804 generates the (1−D)*Ts signal which, as described above, is used to control the on/off state of switch SW2. The LS on to off indication circuit 804 includes transistors M7, M12, M13, and M16, a capacitor C1, and a comparator COMP2. Capacitor C1 has a capacitance that is equal to the capacitance of capacitor Cclk. Transistor M7 is coupled to transistor M2 to form a current mirror with a 1:1 current mirror ratio. Accordingly, the current I7 through transistor M7 is approximately equal to current I1 (i.e., I7=1/Rt).

Transistors M12 and M13 are also coupled together to form a current mirror having, for example, a 1:1 current mirror ratio. Accordingly, the current I13 through transistor M13 is approximately equal to the current I7 through transistor M7, which is approximately equal to current I1 (1/Rt). When the clock signal CLK is logic low, transistor M16 is off and charge on capacitor C1 discharges through transistor M13. Because the current I13 through transistor M13 is controlled to be approximately equal to current I1 (i.e., 1/Rt), the discharge current from capacitor C1 is a fixed current approximately equal to current I1 and accordingly, the voltage on capacitor C1, which is labeled as RAMP_DN decreases linearly. Further, because (a) the discharge current I13 from capacitor C1 is approximately equal to current I1 and (b) the capacitance of capacitor C1 is approximately equal to the capacitance of capacitor Cclk, the absolute value of the magnitude of the linearly decreasing slope of RAMP_DN is approximately equal to the absolute value of the magnitude of the linearly increasing slope of RAMP. RAMP_DN is provided to the negative input of comparator COMP2 and voltage Vd is provided to the positive input of comparator COMP2.

Figure 10:
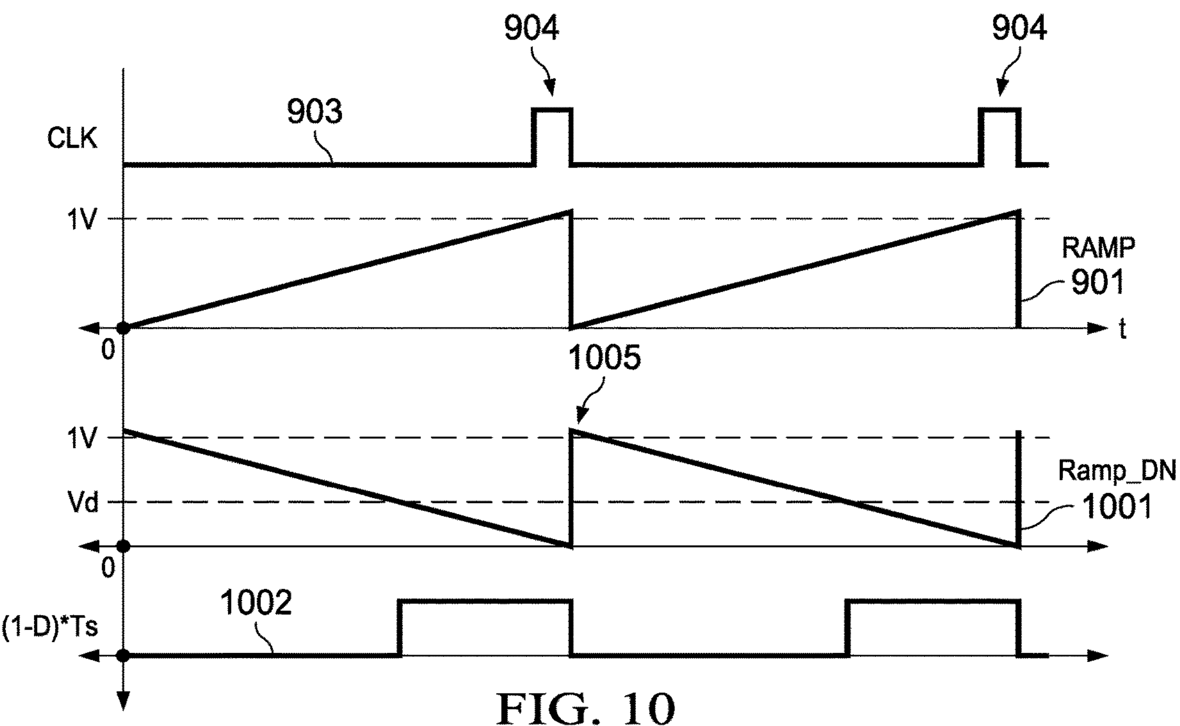

FIG. 10 illustrates waveforms 1001 and 1002 associated with the operation of the LS on to off indication circuit 804. Waveform 1001 is RAMP_DN and waveform 1002 is (1−D)*Ts. Waveforms 901 (RAMP) and 903 (CLK) also are shown in FIG. 10. While RAMP_DN is greater than Vd, the signal (1−D)*Ts is logic low. When RAMP_DN falls below Vd, comparator COMP2 forces signal (1−D)*Ts high and (1−D)*Ts remains high until a clock pulse 904 occurs. As explained above, a clock pulse 904 occurs when RAMP exceeds the voltage (e.g., 1V) on the negative input of comparator COMP1. The clock signal CLK is coupled to and controls the gate of transistor M16. The drain of transistor M16 is coupled to a voltage of 1V (the same voltage as on the negative input of comparator COMP1. Transistor M16 is turned on for the duration of the clock pulse 904. When transistor M16 is turned on, capacitor C1 is charged to a voltage of 1V and thus RAMP_DN is reset to 1V as shown at 1005 at which time the positive pulse of (1−D)*Ts terminates. Upon transistor M16 turning off (which occurs when clock pulse 904 terminates), RAMP_DN again decreases linearly as shown.

Referring back to FIG. 8A, the signal (1−D)*Ts is coupled to an input of the offset current generator circuit 805. The offset current generator circuit 805 includes a one-shot circuit 830, a switch SW3, a sample-and-hold (S/H) circuit 832, a V-to-I converter 823, and offset current source Ios. One-shot circuit 830 includes an input that is coupled to the output of comparator COMP2 and thus the one-shot circuit 830 receives signal (1−D)*Ts. Upon detection of a rising edge of signal (1−D)*Ts, the one-shot circuit 830 generates a pulse 831 on its output signal 831. The output signal 831 from the one-shot circuit 830 controls the on and off state of switch SW3. When the one-shot pulse occurs, switch SW3 is turned on for the duration of the pulse. Switch SW3 receives a signal called Vslope (generated by the adaptive slope compensation circuit 802 and described below), which is provided to the S/H circuit 832 upon switch SW3 being turned on (closed). Accordingly, the S/H circuit 832 samples signal Vslope upon occurrence of a rising edge of signal (1−D)*Ts, which occurs when the LS transistor is turned off. This means that the S/H circuit 832 samples signal Vslope at the moment during each switching cycle during CCM that the LS transistor is turned off.

The sampled voltage from the S/H circuit 832 is Vz and is provided to the V-to-I converter 823, which includes an op-amp 815, a transistor M14 and a resistor R3. Resistor R3 is equal to Rcont/K where Rcont is a resistor within the valley plus slope generation circuit 806 and K is a constant. Voltage Vz is converted to the current Iz described above. Current Iz is equal to (K*Vz)/Rcont+Ios.

The adaptive slope compensation circuit 802 includes transistors M4, M5, and M9, and a capacitor C2. Capacitor C2 may have the same capacitance value as capacitor Cclk. Transistor M4 is approximately the same size as transistor M2. Transistor M5 has a size that is 0·M times the size of transistor M2 (where M is greater than 0 and less than 1). Transistors M4 and M5 are coupled together and to transistor M2 to form a current mirror. The current through transistor M4 is approximately equal to I1 and the current through transistor M5 is 0·M*I1. The drains of transistors M4 and M5 are coupled together to provide a current I5 that is the sum of the currents from transistors M4 and M5. Combined current I5 is approximately equal to 1·M*I1, which is 1·M*(1/Rt). A portion of current I5 flows through transistor M8 as current I2, and the rest of current I5 is shown in FIG. 8A as current I9. Current I9 is thus I5-I2, which is equal to (1·M−D)/Rt. If M were equal to 0, current I9 would be equal to (1−D)/Rt which is the minimum required slope compensation for stability. Due to implementation non-idealities, M is included for sufficient slope compensation margin.

Figure 11:
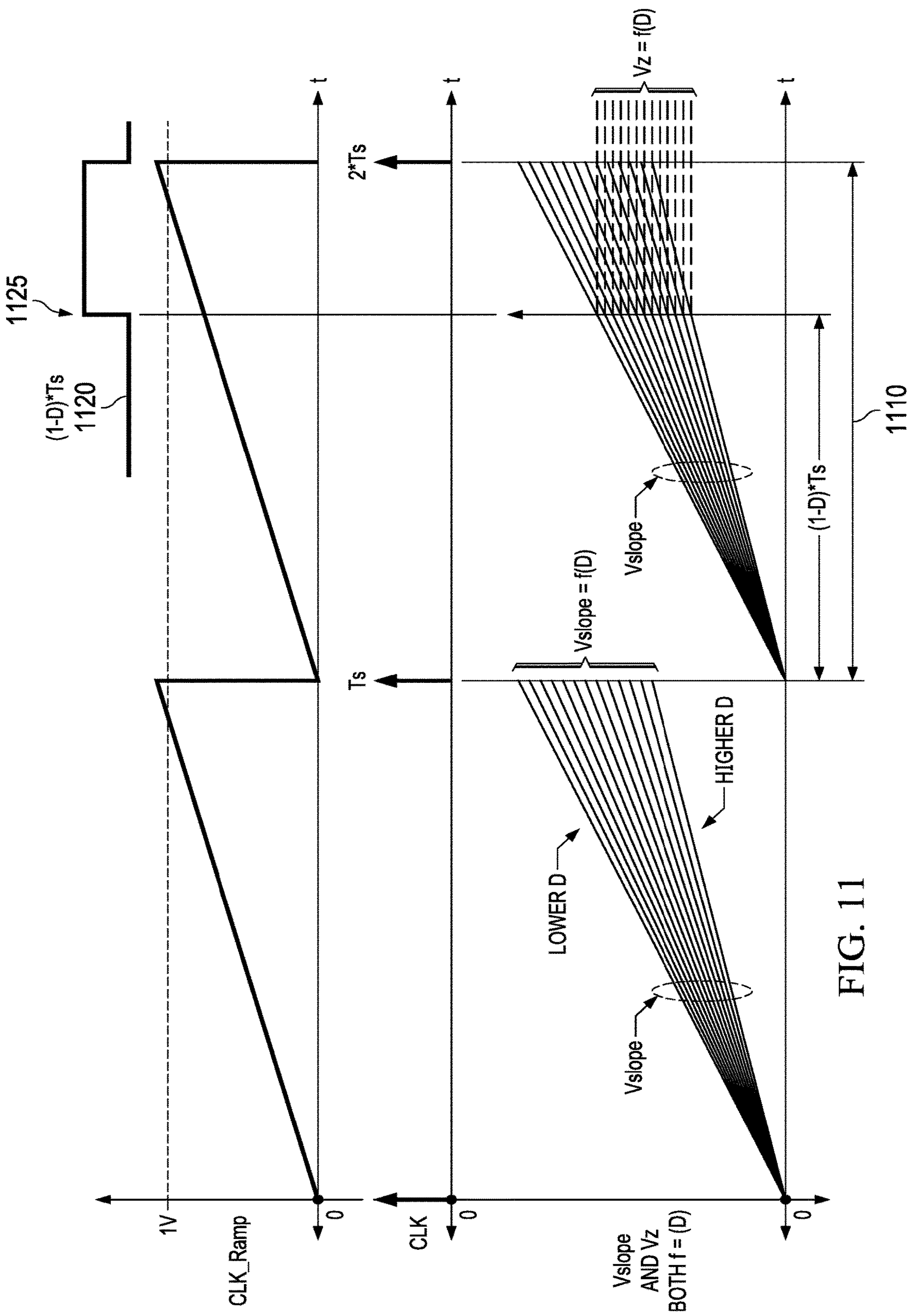

The on and off state of transistor M9 is controlled by the clock signal CLK (e.g., M9 is on during a positive pulse of CLK, and off when CLK is low). Current I9 charges capacitor C2 when transistor M9 is off. The voltage on capacitor C2 is labeled Vslope and linearly increases as capacitor C2 is charged with a slope that is a function of the magnitude of current I9. As explained above, current I9 is the difference between I5 and I2, and current I2 is directly related to the duty cycle D. Accordingly, current I9 is inversely related to duty cycle D—current I9 is smaller at higher levels of duty cycle and is larger at lower levels of duty cycle D. As a result of this inverse relationship between duty cycle and the magnitude of current I9, the slope of the signal Vslope is larger at smaller levels of duty cycle and is smaller at lower levels of duty cycle. FIG. 11 illustrates the relationship between duty cycle D and the slope of Vslope. FIG. 11 illustrates multiple instances of signal Vslope, each Vslope instance corresponding to a different level of duty cycle D. As shown, the slope of signal Vslope is smaller at higher levels of duty cycle and is larger at lower levels of duty cycle. Accordingly, the slope signal Vslope is adaptive based on the duty cycle D. When transistor M9 is on, capacitor C2 discharges through transistor M9, and the magnitude of signal Vslope drops to approximately 0 V. The pulse of the clock signal CLK is of a relatively short duration and thus once Vslope falls to 0V, the next cycle in which Vslope linearly increases starts fairly quickly as shown in FIG. 11.

Referring still to FIG. 11 in conjunction with FIG. 8A, an illustrative switching cycle 1110 also shows various instances of signal Vslope for different levels of duty cycle. Waveform 1120 is shown which represents signal (1−D)*Ts. As explained above, rising edge 1125 of signal (1−D)*Ts is the instant in which the inductor current IL has reached the compensated valley current command and the LS transistor is turned off. At that instant, the one-shot circuit 830 generates a pulse to close switch SW3 to thereby cause S/H circuit 832 to sample the signal Vslope. Because the slope of signal Vslope is a function of duty cycle D, the sampled voltage of signal Vslope also is a function of duty cycle. The sampled Vslope voltage is labeled Vz in FIG. 11. The sampling of signal Vslope occurs in each switching cycle of the converter 100.

The valley plus slope generation circuit 806 converts the signal Vslope and a signal called Vcomp (described below regarding FIG. 8B) to corresponding currents, Islope and Ivy, and adds those currents together to produce a current labeled in FIG. 8A as Ivy+Islope. The valley plus slope generation circuit 806 includes V-to-I converters 824 and 825. The V-to-I converter 824 includes an op-amp 812, a transistor M10, and a resistor Rcont/K. The voltage level of signal Vslope is converted to current Islope that equals (K*Vslope)/Rcont. The V-to-I converter 825 includes an op-amp 813, a transistor M11, and a resistor Rcont. The voltage level of signal Vcomp is converted to current Ivy that equals Vcomp/Rcont. The drains of transistors M10 and M11 are coupled together to thereby add Ivy and Islope.

Referring to FIG. 8B, a portion of offset current generator circuit 805 is shown along with the valley plus slope generator circuit 806. Also shown in FIG. 8B is a Vcomp generator circuit 808 a Tpfm generator circuit 850, a state machine 852, comparators 854 and 856, gate drivers 112 and 114 and 862, sense networks 870 and 872, the HS and LS transistors, and transistors M17-M20.

The Vcomp generator circuit 808 includes an error amplifier 875, resistors R4, R5, and Rc, a capacitor Cc, a reference voltage generator 876, a high clamp 877, and a low clamp 878. The reference voltage generator 876 generates a reference voltage Vref based on, for example, a bandgap voltage Bgap from a bandgap voltage source and controlled by a system enable signal (Sys_En). Resistors R4 and R5 are connected in series between Vout and ground and form a voltage divider to produce a feedback voltage Vfb which is a scaled-down version of Vout.

The error amplifier 875 includes a positive input coupled to Vref and a negative input coupled to Vfb, and amplifies the difference between Vref and Vfb. The output of the error amplifier 875 is a current whose magnitude is a function of the amplified difference between Vref and Vfb and is provided to the series connection of resistor Rc and capacitor Cc. As the error amplifier's current flows to resistor Rc and capacitor Cc, the capacitor Cc is charged up and the voltage on the output of the error amplifier 875 increases. The voltage on the output of the error amplifier 875 is the signal Vcomp.

Upon a sudden increase in load current, the output voltage Vout will drop temporarily before it recovers to its regulated output voltage level. When Vout decreases, the output current from the error amplifier 875 increases, adding more charge to capacitor Cc, and thereby increasing the voltage of the signal Vcomp. Accordingly, the magnitude of signal Vcomp is a function of load current. The high and low clamps 877 and 878 provide a range within which the signal Vcomp operates. In one example embodiment, the high clamp 877 provides an upper limit for Vcomp of 1V and the low clamp provides a lower limit of 0V giving a full operating dynamic range of 1V for the converter.

The combined current Ivy and Islope flows through transistor M19 which is coupled to transistor M20 in a current mirror configuration (with a 1:1 current mirror ratio). Accordingly, the current I20 through transistor M20 also is equal to Ivy+Islope. The current I20 flows into sense network 872. Sense network 872 includes one or more transistors connected in series between transistor M20 and the switch node SW between the HS and LS transistors. Accordingly, the on-resistances of the transistors forming the sense network 872 sum to provide a sense resistance. As a result of the current I20 flowing through the sense network 872, a voltage is created across the sense network on terminal 873 that is a function of current Ivy+Islope. That voltage (which represents Ivy+Islope) is coupled to the positive input of comparator 856.

The offset current Iz flows through transistor M17, which is coupled to transistor M18 in a current mirror configuration (1:1 ratio). The current through transistor M18 is current I18 which equals current Iz. The sense network 870 (also a series connected stack of transistors) receives current I18 and a corresponding voltage is generated across the sense network 870 on terminal 874. The voltage so created is a function of current Iz. Accordingly, the offset current Iz and the current Ivy+Islope are converted to corresponding voltages and compared by comparator 856. FIG. 8B also shows the low side transistor LS. The current mirror ratio between the transistors in the sense networks 872 and 874 and the LS transistor are such that the current through the sense network 872 is small fraction of the inductor current, IL. The current through the LS transistor flows up into sense network 872 in the opposite direction as current I20 (which represents Ivy+Islope). Accordingly, the voltage produced on terminal 873 is a voltage that represents Ivy+Islope-IL.

As explained above, for valley current mode control, the inductor current IL is compared to a compensated valley command current (Ivy+Islope), and in accordance with the embodiment described above regarding FIG. 7, the converter 100 compares ILS+IZ to Islope+Ivy. In the example implementation of FIG. 8B, the comparator 856 compares a voltage that is a function of Ivy+Islope-ILS on its positive input to a voltage that is a function Iz on its negative input, which is functionally equivalent to comparing ILS+IZ to Ivy+Islope.

The output of comparator 856 produces a signal called IL_LT_VY (inductor current less than valley command current). Signal IL_LT_VY is forced low by comparator 856 when Ivy+ISlope-ILS is smaller than Iz. Comparator 856 asserts signal IL_LT_VY high when Ivy+ISlope-ILS is larger than Iz, that is when ILS+Iz reaches Ivy+Islope which is functionally equivalent to, as is depicted in FIG. 7, the inductor current IL plus Iz falling down to and reaching the slope compensated valley command current (Ivy+Islope).

Signal IL_LT_VY is provided as an input to the state machine 852. The state machine 852 also receives the signal D*Ts and the clock signal CLK as inputs. The state machine 852 may comprise, for example, a combination of logic gates, flip-flops, and other circuit components to perform functionality described herein. Similarly, the Tpfm generator circuit also may comprise logic gates, flip-flops, and other circuit components to perform functionality described herein.

Figure 12:
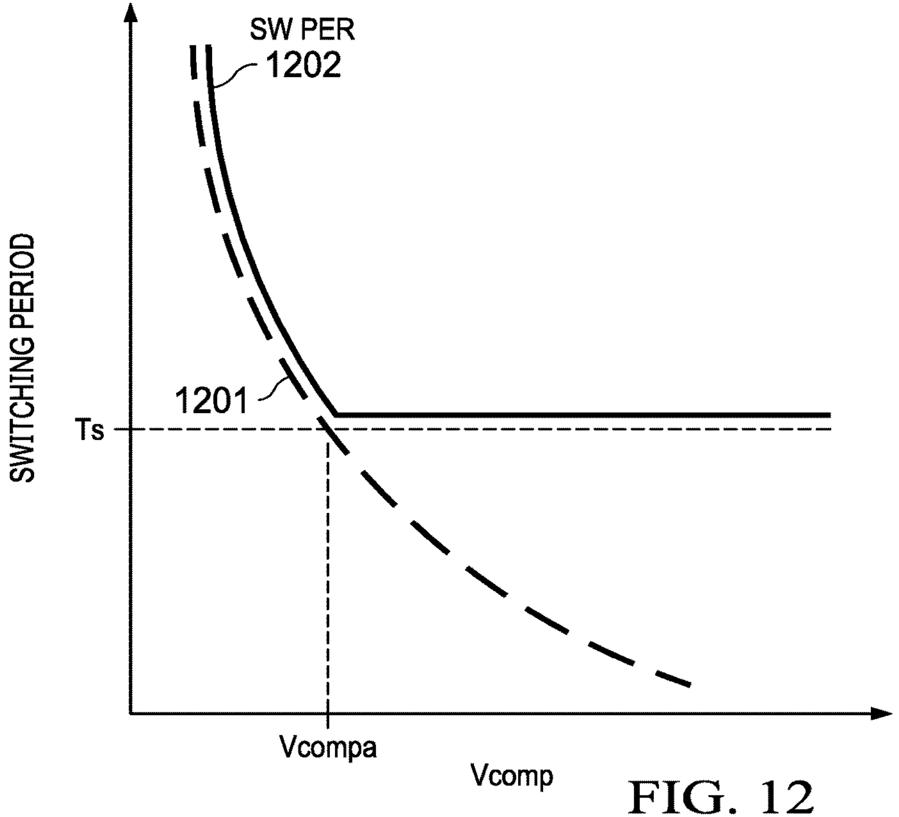
FIG. 12 illustrates the lengthening of the switching period during PFM for lower levels of load current.

As explained above, the switching period during CCM (Ts) is of a fixed length. However, during PFM, the switching period is lengthened. The Tpfm generator circuit 850 and the state machine 852 implement the functionality to lengthen the switching period. The Tpfm generator circuit 850 receives, as inputs, Vcomp and Ts, and generates a signaled SW. PER 853. FIG. 8C shows an example implementation of at least a portion of the Tpfm generator circuit 850. Referring to FIG. 8C, Vcomp controls the gate of transistor M81. Transistors M81 and M82 and resistor R81 forms a voltage-to-current converter, whose current is mirrored by transistor M83. The current through transistor M83 charges capacitor C81 thereby creating a ramp voltage waveform to the input of buffer BUFF1. Each pulse of Ts pulls the ramp voltage low. The output of the buffer BUFF1 is signal SW. PER. 853. The Tpfm generator 850 implements the functionality shown in FIG. 12. FIG. 12 shows switching period on the y-axis and Vcomp on the X-axis. The CCM switching period, Tccm, is shown as well. Waveform 1201 represents an inversely proportional relationship between switching period and Vcomp implemented within the Tpfm generator circuit 850. The Tpfm generator circuit 850 generates signal SW. PER. 853 that is the larger of the signals between waveform 1201 and Ts for the present value of Vcomp. Accordingly, at heavy loads (e.g., above Vcomp=Vcompa), Vcomp is relatively high and the switching frequency of the converter 100 is determined by the CCM switching period Tccm. At lower load conditions, Vcomp is smaller and at values of Vcomp below Vcompa, the Tpfm generator circuit 850 outputs as SW. PER. 853 the value from waveform 1201 thereby extending the switching period during PFM.

The state machine 852 controls the on and off state of the HS and LS transistors by asserting signal HS_ON (e.g., logic high to turn on the HS transistor and off otherwise) and LS_ON (e.g., logic high to turn on the LS transistor and off otherwise). The HS_ON signal is provided to an input of gate driver 112, which provides a suitable voltage to turn on the HS transistor responsive to signal HS_ON being asserted high. Similarly, the LS_ON signal is provided to an input of gate driver 114, which provides a suitable voltage to turn on the LS transistor responsive to signal LS_ON being asserted high. During CCM, the state machine 852 turns on the HS transistor responsive to signal IL_LT_VY being in a logic state (e.g., logic high) indicative of the inductor current (via its proxy current ILS) plus the offset current Iz falling below the compensated valley current command. During CCM, the state machine 852 turns off the HS transistor and turns on the LS transistor upon receipt of a pulse on the clock signal CLK.

Comparator 854 is used to compare the voltage on the switch node (SW) to 0 V to determine the zero-crossing point for the inductor current IL. The output of comparator 854 is a zero-crossing signal, ZX, which is logic low until the zero-crossing point occurs and then is forced high by the comparator. Signal ZX also is provided as an input signal to the state machine 852, and the state machine 852 turns off the LS transistor during DCM and PFM upon assertion of the ZX signal to a state (e.g., low) that indicates that the inductor current has reached 0 A. The state machine 852 measures the amount of time that the LS transistor is on before ZX is asserted.

During PFM (as well DCM), the state machine 852 determines the length of the HiZ time period to be the switching period less the sum of the on-times of the HS and LS transistors. The Tpfm generator circuit 850 determines the length of the switching period as described above. The HS transistor on-time is the length of the positive pulse of the D*Ts signal, and the LS transistor on-time is determined as noted above. The HiZ state is implemented by the state machine 852 not asserting either the HS_ON or the LS_ON signal and thereby keeping both transistors in an off state. At the end of the HiZ period of time, the state machine 852 asserts the HS_ON signal to turn on the HS transistor. The process repeats for each subsequent switching cycle.

Figure 13:
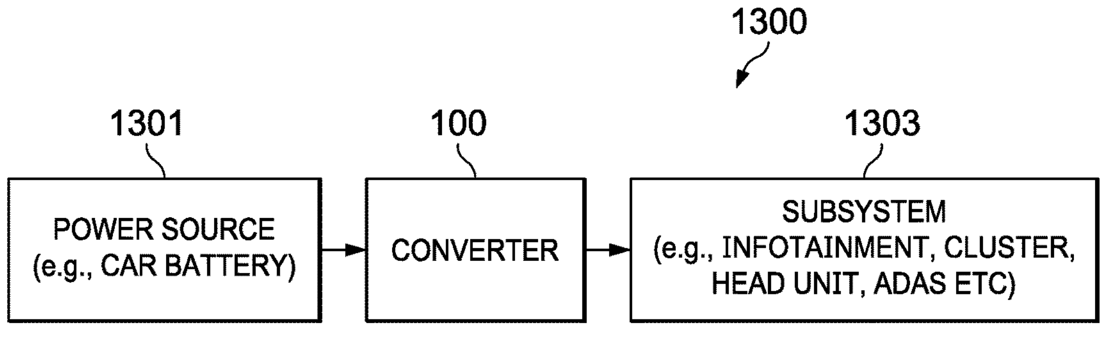
FIG. 13 shows an example of a system in which the converter of FIG. 1 can be used.

FIG. 13 is an example of a system 1300 in which the converter 100 may be included. In this example, system 1300 is an automotive application and includes a power source such as a vehicle's battery 1301 and an automotive subsystem 1303 such as an infotainment subsystem, an instrument cluster, a heads-up display unit, an advanced driver assistance system (ADAS), etc. Converter 100 receives the vehicle's battery voltage (e.g., 12 V) and converts that voltage to a suitable voltage level (e.g., 3.3 V, 5 V, etc.) for powering the subsystem 1303.

Circuits described herein are reconfigurable to include the replaced components to provide functionality at least partially similar to functionality available prior to the component replacement. Components shown as resistors, unless otherwise stated, are generally representative of any one or more elements coupled in series and/or parallel to provide an amount of impedance represented by the shown resistor. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

Unless otherwise stated, "about," "approximately," or "substantially" preceding a value means +/−10 percent of the stated value.

Modifications are possible in the described embodiments, and other embodiments are possible, within the scope of the claims.

What is claimed is:

1. An apparatus, comprising:

a first transistor coupled between a power input and a switching terminal, and having a first control terminal;

a second transistor coupled between the switching terminal and a ground terminal, and having a second control terminal; and a controller having a current sense input, a feedback voltage input, a reference input, and first and second controller outputs, the current sense input coupled to the second transistor, the feedback voltage input coupled to a power output, the first controller output coupled to the first control terminal, the second controller output coupled to the second control terminal, and the controller configurable to:

generate a first signal indicative of a difference between a first voltage at the feedback voltage input and a second voltage at the reference input, in which the first signal has a non-negative voltage;

responsive to a trigger signal, start a first interval of a switching cycle, and provide first control signals at the first and second controller outputs to turn off the first transistor and turn on the second transistor in the first interval;

responsive to a comparison involving a second signal at the current sense input, the first signal, and a ramp signal, end the first interval; and after the first interval ends, start a second interval of the switching cycle, and provide second control signals at the first and second controller outputs to turn on the first transistor and turn off the second transistor in the second interval.

2. The apparatus of claim 1, wherein a duration of the second interval reflects a ratio between a third voltage at the power output and a fourth voltage at the power input.

3. The apparatus of claim 2, wherein the controller is configured to sample the ramp signal responsive to the second transistor being turned off.

4. The apparatus of claim 3, wherein the controller is configured to:

provide an offset current responsive to the sampled ramp signal;

provide a first current responsive to the second signal;

provide a second current responsive to the first signal;

provide a third current responsive to the ramp signal; and start the second interval responsive to a sum of the offset current and the first current being equal to a sum of the second current and the third current.

5. The apparatus of claim 4, wherein the controller includes a comparator configurable to compare the sum of the offset current and the first current to the sum of the second current and the third current.

6. The apparatus of claim 1, further including a duty cycle estimation circuit having first and second switches, wherein a first switch has a first switch control input and a second switch has a second switch control input, the second switch is coupled between the first switch and the ground terminal, and the apparatus further includes:

a first comparator having a first comparator output that is coupled to the first switch control input; and a second comparator having a second comparator output that is coupled to the second switch control input.

7. The apparatus of claim 1, wherein the controller is configurable to, in a first mode, set a period of the switching cycle as a sum of the first and second intervals, and in a second mode, set a period of the switching cycle as a sum of the first and second intervals and a third interval, in which the controller is configurable to provide third controls signals at the first and second controller outputs to turn off the first and second transistors in the third interval.

8. The apparatus of claim 7, wherein the controller is configurable to set a duration of the third interval responsive to the difference.

9. An apparatus, comprising:

a controller having a current sense input, a feedback voltage input, a reference input, and first and second controller outputs, the controller configurable to:

generate a first signal indicative of a difference between a first voltage at the feedback voltage input and a second voltage at the reference input, in which the first signal has a non-negative voltage;

responsive to a trigger signal, start a first interval of a switching cycle, and provide first control signals at the first and second controller outputs to turn off a high side transistor and turn on a low side transistor in the first interval;

responsive to a comparison involving a second signal at the current sense input, the first signal, and a ramp signal, end the first interval; and after the first interval ends, start a second interval of the switching cycle, and provide second control signals at the first and second controller outputs to turn on the high side transistor and turn off the low side transistor in the second interval.

10. The apparatus of claim 9, wherein the second interval reflects a ratio between a third voltage at a power output of a power converter including the high side and low side transistors, and a fourth voltage at a power input of the power converter.

11. The apparatus of claim 10, wherein the controller is configurable to sample the ramp signal responsive to the low side transistor being turned off.

12. The apparatus of claim 11, wherein the controller is configured to:

provide an offset current responsive to the sampled ramp signal;

provide a first current responsive to the second signal;

provide a second current responsive to the first signal;

provide a third current responsive to the ramp signal; and start the second interval responsive to a sum of the offset current and the first current being equal to a sum of the second current and the third current.

13. The apparatus of claim 12, wherein the controller includes a comparator configurable to compare the sum of the offset current and the first current t to the sum of the second current and the third current.

14. The apparatus of claim 9, wherein the controller is configurable to, in a first mode, set a period of the switching cycle as a sum of the first and second intervals, and in a second mode, set a period of the switching cycle as a sum of the first and second intervals and a third interval, in which the controller is configurable to provide third controls signals at the first and second controller outputs to turn off the low side and high side transistors in the third interval.

15. The apparatus of claim 14, wherein the controller is configurable to set a duration of the third interval responsive to the difference.

* * * * *